US011850693B2

(12) United States Patent
Eble et al.

(10) Patent No.: US 11,850,693 B2
(45) Date of Patent: Dec. 26, 2023

(54) MACHINE TOOL AND MACHINING METHOD

(71) Applicant: CHIRON Group SE, Tuttlingen (DE)

(72) Inventors: Michael Eble, Fridingen (DE); Karl-Heinz Raffke, Aldingen (DE); Swenja Koch-Weiler, Bodman-Ludwigshafen (DE); Heinrich Bissert, Orsingen-Nenzingen (DE); Claus Eppler, Messstetten (DE); Robert Gref, Muehlheim (DE)

(73) Assignee: CHIRON Group SE, Tuttlingen (DE)

( * ) Notice: Subject to any disclaimer, the term of this patent is extended or adjusted under 35 U.S.C. 154(b) by 315 days.

(21) Appl. No.: 17/189,576

(22) Filed: Mar. 2, 2021

(65) Prior Publication Data

US 2021/0178539 A1 Jun. 17, 2021

Related U.S. Application Data

(63) Continuation of application No. PCT/EP2019/073258, filed on Aug. 30, 2019.

(30) Foreign Application Priority Data

Sep. 10, 2018 (DE) ...................... 10 2018 121 970.9

(51) Int. Cl.
*B23Q 3/157* (2006.01)
*B23Q 3/155* (2006.01)

(52) U.S. Cl.
CPC ...... *B23Q 3/15539* (2016.11); *B23Q 3/15536* (2016.11); *B23Q 3/15706* (2013.01);
(Continued)

(58) Field of Classification Search
CPC ......... Y10T 483/1748; Y10T 483/1752; Y10T 483/1774; Y10T 483/1786;
(Continued)

(56) References Cited

U.S. PATENT DOCUMENTS

| 4,625,387 A | 12/1986 | Stoilov | |
| 4,780,952 A * | 11/1988 | Babel | B23Q 3/15539 |
| | | | 483/68 |

(Continued)

FOREIGN PATENT DOCUMENTS

| CN | 1880010 A | 12/2006 | |
| CN | 201399678 Y * | 2/2010 | ............. B23Q 1/012 |

(Continued)

OTHER PUBLICATIONS

First Office Action (Including Machine Translation) for corresponding Chinese Patent Application No. 201980058565.6, dated Jul. 1, 2022.

(Continued)

*Primary Examiner* — Sunil K Singh
*Assistant Examiner* — Michael Vitale
(74) *Attorney, Agent, or Firm* — Jason H. Vick; Sheridan Ross, PC

(57) ABSTRACT

A machine tool for machining workpieces comprises at least one tool spindle, at least one workpiece table, at least one first tool magazine, and at least one second tool magazine. The at least one tool spindle and the at least one workpiece table are movable relative to one another along a vertical axis and two horizontal axes to machine a workpiece that is clamped on the workpiece table with a tool that is clamped in the tool spindle. The vertical axis and the two horizontal axes are orthogonal to one another. The at least one first tool magazine, a tool set is provided that comprises a plurality of tools for machining, wherein the tools can be selectively clamped in the tool spindle. The at least one second tool magazine, a tool set is provided that comprises a plurality of tools for machining, wherein the tools can be selectively clamped in the tool spindle. Only one tool magazine of the at least one first tool magazine and the at least one second
(Continued)

tool magazine is active at a time, so that exclusively the tool set from the respective active tool magazine is used for machining the clamped workpiece. There is also provided a corresponding method of machining workpieces.

19 Claims, 5 Drawing Sheets

(52) U.S. Cl.
CPC ...... *B23Q 3/15713* (2013.01); *B23Q 3/15724* (2016.11); *Y10T 483/115* (2015.01); *Y10T 483/175* (2015.01); *Y10T 483/1855* (2015.01); *Y10T 483/1891* (2015.01)

(58) Field of Classification Search
CPC ......... Y10T 483/1845; Y10T 483/1855; Y10T 483/1873; Y10T 483/1891; Y10T 483/175; Y10T 483/115; B23Q 3/15539; B23Q 3/15713; B23Q 3/15724; B23Q 3/15753; B23Q 3/1576; B23Q 3/15766; B23Q 2003/155404; B23Q 2003/155407; B23Q 2003/155411; B23Q 3/15533
USPC ..... 483/36, 37, 38, 47, 52, 63, 64, 66, 68, 3
See application file for complete search history.

(56) References Cited

U.S. PATENT DOCUMENTS

| | | | | |
|---|---|---|---|---|
| 5,046,223 A | * | 9/1991 | Kraus | F16B 21/086 24/297 |
| 5,300,006 A | * | 4/1994 | Tanaka | B23Q 3/15706 483/67 |
| 5,364,329 A | | 11/1994 | Line | |
| 5,672,145 A | * | 9/1997 | Pollington | B23Q 3/15706 483/65 |
| 6,450,932 B1 | | 9/2002 | Hirose et al. | |
| 6,685,608 B2 | * | 2/2004 | Menzio | B23Q 3/15533 483/58 |
| 7,404,786 B2 | | 7/2008 | Krosta et al. | |
| 2014/0200126 A1 | * | 7/2014 | Prust | B23Q 3/15539 483/30 |
| 2014/0274627 A1 | | 9/2014 | Bernhard et al. | |
| 2020/0001417 A1 | * | 1/2020 | Saeufferer | B23Q 3/15706 |

FOREIGN PATENT DOCUMENTS

| | | | | |
|---|---|---|---|---|
| DE | 3316999 A | * | 2/1984 | ......... B23Q 3/15526 |
| DE | 216667 A | * | 12/1984 | |
| DE | 3440356 A1 | | 5/1985 | |
| DE | 4342630 A1 | | 6/1994 | |
| DE | 19510498 A1 | | 9/1996 | |
| DE | 19860709 A1 | | 2/2001 | |
| DE | 10225143 A1 | | 1/2004 | |
| DE | 10236342 A1 | | 2/2004 | |
| DE | 102008014779 A1 | | 9/2009 | |
| DE | 202014009762 U1 | * | 4/2016 | ......... B23Q 3/15513 |
| DE | 102014224604 A1 | * | 6/2016 | ............. B23Q 1/012 |
| EP | 2269769 A1 | | 1/2011 | |
| EP | 2777872 A1 | | 9/2014 | |
| EP | 2842705 A1 | * | 3/2015 | ............. B23Q 1/037 |
| WO | WO 2006/056726 | | 6/2006 | |
| WO | WO-2018172061 A1 | * | 9/2018 | ............. B23Q 1/012 |

OTHER PUBLICATIONS

International Search Report for International Application No. PCT/EP2019/073258, dated Dec. 12, 2019.
International Preliminary Report on Patentability for International Application No. PCT/EP2019/073258, dated Mar. 25, 2021.

* cited by examiner

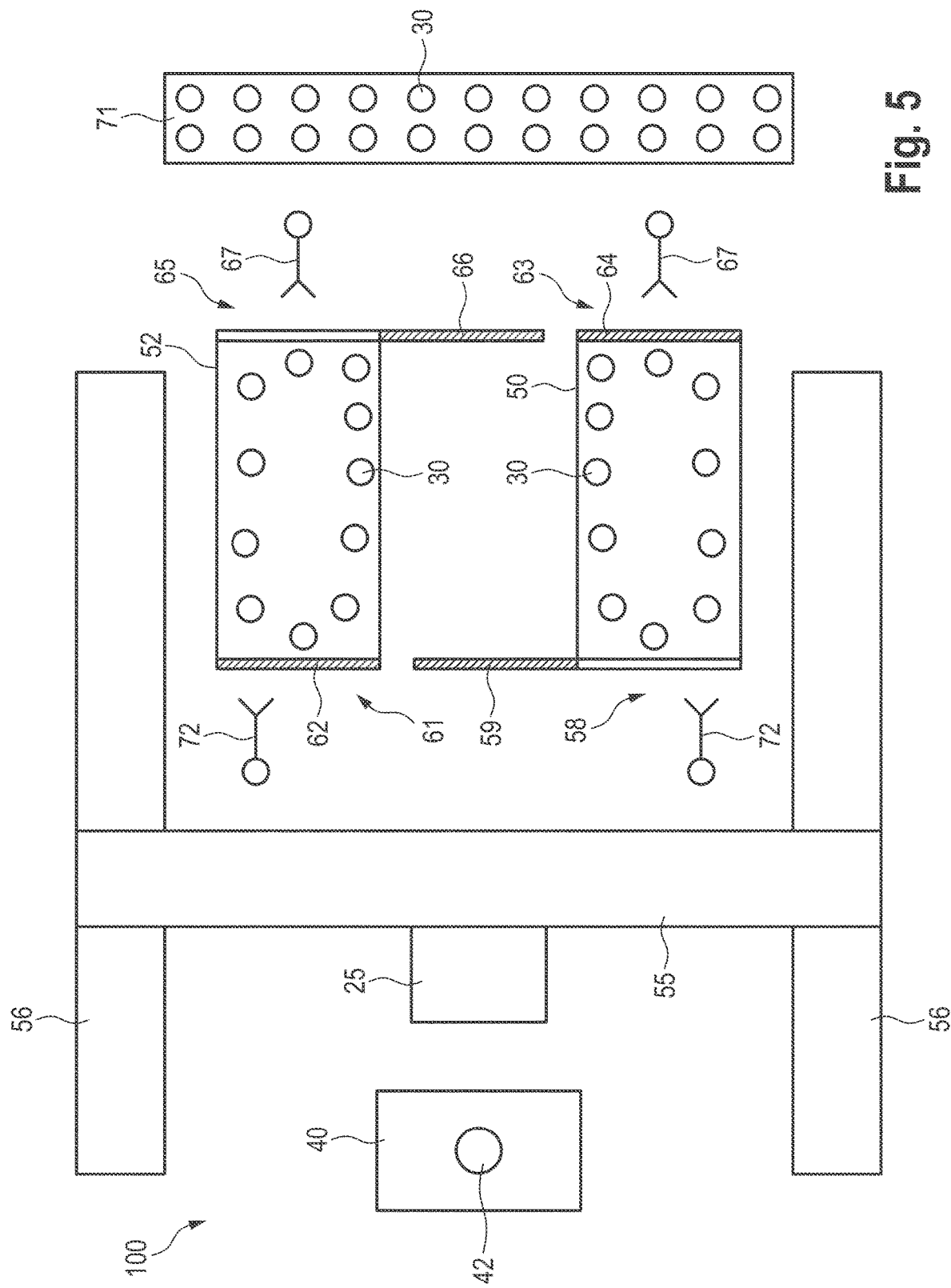

MACHINE TOOL AND MACHINING METHOD

CROSS-REFERENCES TO RELATED APPLICATIONS

This application is a continuation of international patent application PCT/EP2019/073258, filed on Aug. 30, 2019 and designating the U.S., which international patent application has been published in German language and claims priority to German patent application 10 2018 121 970.9, filed on Sep. 10, 2018. The entire contents of these priority applications are incorporated herein by reference.

BACKGROUND

The present disclosure relates to a machine tool and to a method for processing, for instance machining, at least first workpieces and second workpieces that are different therefrom. In certain embodiments, the present disclosure relates to a machine tool comprising at least one tool spindle and at least one workpiece table, which are movable relative to one another along a vertical axis and two horizontal axes, wherein the three axes are oriented orthogonal to one another, in order to machine a workpiece that is clamped on the workpiece table with a tool that is clamped in the tool spindle. In certain embodiments, the present disclosure relates to a machine tool comprising at least one tool magazine, in which a tool set with tools for machining the workpiece is kept in stock, which tools can be selectively clamped in the tool spindle.

DE 102 25 143 A1 discloses a conventional machine tool, the machine tool being arranged as a moving column machine and having a vertical tool spindle, which is arranged to change tools according to the pick-up process with a tool magazine, wherein the tool magazine travels together with the moving column along a horizontal axis of movement, and wherein the tool magazine is mounted so that it can be moved along the other horizontal axis of movement in such a way that it can be moved into the working space with its tool change site for the tool change.

Since this tool magazine is arranged to travel with the workpiece, the number of storage locations for tools available therein is limited for dynamic reasons. The conventional machine tool according to DE 102 25 143 A1 is therefore equipped with a background magazine, from which tools can also be exchanged with the tool magazine during the machining of a workpiece parallel to the main processing time.

When such a conventional machine tool has to be converted from the machining of first workpieces to the machining of second workpieces that are different therefrom, the tools of the tool magazine and, if necessary, of the background magazine are completely or partially exchanged for new tools, for which the machine tool is shut down. This means that a production downtime occurs during such a changeover.

With the conventional machine tool, in addition to the production downtime during changeover, it is also a disadvantage that the traveling tool magazine enables a fast tool change, but negatively influences the dynamics due to the higher weight. All this leads to the fact that the productivity achievable with the conventional machine tool, i.e. the throughput of machined workpieces, is often perceived as insufficient.

US 2014/0274627 A1 discloses a machine tool that is arranged as a vertical machining center in gantry form, in which a machine frame in the form of a horizontal U encloses a working space, in which a device for clamping workpieces to be machined is mounted so as to be pivotable about a horizontal axis. The vertical tool spindle is mounted on the side walls of the U-shaped machine frame.

A tool magazine in circular form is arranged within the machine frame, at which the tool spindle can change tools in accordance with the pick-up process.

Below the tool magazine, an identical tool magazine is provided, in which further tools are kept in stock, which can be reloaded between the two tool magazines with the aid of a reloading device that is arranged at an opening of the machine frame, so that the tools, which can be used directly for machining the workpieces, are respectively located in the upper tool magazine, from which they are interchanged to and from the tool spindle in accordance with the pick-up process.

The conventional machining center according to US 2014/0274627 A1 enables the machining of diverse workpieces with a large number of tools, but the total number of available tools is limited to the common storage capacity of the two tool magazines.

A further disadvantage is that reloading the tools can require time-consuming indexing, i.e. sharing of both tool magazines, in order to move blanks and tools to be loaded or unloaded to the reloading device. This reduces productivity because, as the case may be, after the end of the machining of a workpiece with a tool, it may be necessary to wait until the reloading process is completed before the old tool can be taken off and a new tool can be taken into the tool spindle.

Another disadvantage with the conventional machining center is that when converting from machining first workpieces to machining second workpieces, the tools of both tool magazines have to be completely or partially exchanged for new tools, which leads to a production downtime.

In view of this, it is an object of the present disclosure to further refine the machine tool mentioned at the outset to improve performance and productivity.

It is a further object of the present disclosure to present a machine tool that requires relatively little design effort and that can be manufactured and operated in a cost-efficient manner.

It is a further object of the present disclosure to present a machine tool that is suitable for the manufacture of two different types of workpieces, while reducing non-productive times for the changeover between the different types of workpieces.

It is a further object of the present disclosure to present a machine tool and a corresponding machining method that facilitate tool storage and management.

It is a further object of the present disclosure to present a machine tool and a corresponding machining method that provide a huge number of tools for immediate use in the machining operation without compromising the dynamic behavior of the machine tool.

It is a further object of the present disclosure to present suitable and productive machining methods and processes that make use of respective machine tools.

SUMMARY

In regard of the machine tool, these and other objects are achieved by a machine tool for machining workpieces, comprising at least one tool spindle, at least one workpiece table, at least one first tool magazine, and at least one second tool magazine, wherein the at least one tool spindle and the at least one workpiece table are movable relative to one another along a vertical axis and two horizontal axes to machine a workpiece that is clamped on the workpiece table with a tool that is clamped in the tool spindle, wherein the vertical axis and the two horizontal axes are orthogonal to one another, wherein in the at least one first tool magazine, a tool set is provided that comprises a plurality of tools for machining, wherein the tools can be selectively clamped in the tool spindle, wherein in the at least one second tool magazine, a tool set is provided that comprises a plurality of tools for machining, wherein the tools can be selectively clamped in the tool spindle, and wherein only one tool magazine of the at least one first tool magazine and the at least one second tool magazine is active at a time, so that exclusively the tool set from the respective active tool magazine is used for machining the clamped workpiece.

In certain embodiments, there is provided a machine tool for processing, for instance machining, at least first workpieces and second workpieces that are different therefrom, wherein the machine tool comprises at least one tool spindle and at least one workpiece table, which are movable relative to one another along a vertical axis and two horizontal axes, the three axes running orthogonally to one another, in order to machine a workpiece that is clamped on the workpiece table with a tool that is clamped in the tool spindle, and comprising at least one tool magazine, in which a tool set with tools for machining the workpiece is kept in stock, which tools can be selectively clamped in the tool spindle, wherein at least a second tool magazine is provided, from which tools can optionally be clamped into the tool spindle. In certain embodiments, only one tool magazine is active at a time, in such a way that exclusively the tool set from the active tool magazine is respectively used for machining a clamped workpiece.

In certain embodiments, the tools from both tool magazines are available immediately and without delay for machining workpieces without having to transfer tools between the two tool magazines. This may reduce the design effort and increases the throughput because, for example, tools can be removed from one or the other tool magazine as required. By way of example, a tool magazine can provide an empty slot for depositing the last tool used and the other tool magazine can provide the new tool for the next machining operation. When changing tools, it is thus not absolutely necessary to wait until the tool magazine has advanced after a previously used tool has been deposited in order to make the tool to be used next available for removal, which is time-consuming, especially with large tool magazines with many storage locations for tools.

In certain embodiments, the time required for the changeover from the machining of first workpieces to the machining of second workpieces is significantly reduced. While the first workpieces are being machined with tools from the active tool magazine, the inactive tool magazine can simultaneously be equipped with a tool set for machining the second workpieces. In certain embodiments, for this purpose, all or only some tools at the non-active tool magazine are exchanged.

Immediately after machining the last of the first workpieces with tools from the active tool magazine, machining of the second workpieces with the tools from the previously inactive tool magazine can be started.

According to another aspect of the present disclosure, there is presented a method for machining first workpieces and second workpieces that are different from the first workpieces, the method comprising the steps of:

providing a machine tool, comprising:

at least one tool spindle, at least one workpiece table, at least one first tool magazine, and at least one second tool magazine, wherein the at least one tool spindle and the at least one workpiece table are movable relative to one another along a vertical axis and two horizontal axes to machine a workpiece that is clamped on the workpiece table with a tool that is clamped in the tool spindle, wherein the vertical axis and the two horizontal axes are orthogonal to one another, wherein in the at least one first tool magazine, a tool set is provided that comprises a plurality of tools for machining, wherein the tools can be selectively clamped in the tool spindle, wherein in the at least one second tool magazine, a tool set is provided that comprises a plurality of tools for machining, wherein the tools can be selectively clamped in the tool spindle, and wherein only one tool magazine of the at least one first tool magazine and the at least one second tool magazine is active at a time, so that exclusively the tool set from the respective active tool magazine is used for machining the clamped workpiece, machining the first workpieces with the tool set from the active tool magazine of the at least one first tool magazine and the at least one second tool magazine, and equipping, at the same time, a non-active tool magazine of the at least one first tool magazine and the at least one second tool magazine with a tool set for machining the second workpieces.

In certain aspects, the present disclosure also relates to a method for machining at least first workpieces and second workpieces, which are different therefrom, on a machine tool, in which first workpieces are machined with the tool set from an active tool magazine, while at the same time a non-active tool magazine is equipped with a tool set for machining second workpieces. In certain embodiments, the method utilizes a machine tool in accordance with at least one embodiment described herein.

In certain embodiments, the tool magazines are arranged side by side. In certain embodiments, the tool magazines are arranged one above the other.

In certain embodiments, the arrangement of the tool magazines depends on the space available. In certain embodiments, a terraced arrangement of the tool magazines one above the other offers time advantages during tool changes and increases productivity when tools are selectively removed from one or the other tool magazine.

In certain embodiments, the terraced arrangement also offers design advantages when equipping the tool magazines, because automated setup can be performed with a common loading device on both tool magazines.

In certain embodiments, each tool magazine has a tool change site, and that either the tool spindle changes tools at the tool change site of the active tool magazine using the pick-up process, or that a tool changer is provided, which changes tools between the tool spindle and the tool change site of the active tool magazine.

In certain embodiments, tool changing in accordance with the pick-up process is advantageous from a design point of view, because it does not require a tool changer. However, with the pick-up method, either the tool change site must protrude or be moved into the working space, or the tool spindle must move out of the working space.

In certain embodiments, a cover is provided for the tool change site of at least one tool magazine, which cover is closed at least when the respective tool magazine is not active.

In certain embodiments, this has the effect that chips or drilling coolant cannot get into the other tool magazine during the tool change at one tool magazine. This means that the tool change sites of the two tool magazines can be arranged, in terms of design, in such a way that fast tool changes are possible, which increases productivity.

In certain embodiments, each tool magazine has a tool fitting site, at which tools are exchanged in order to equip the inactive tool magazine completely or partially with new tools for machining a workpiece. In certain embodiments, a loading device is assigned to each tool magazine, by means of which tools can be removed from an inactive tool magazine and/or tools are inserted into an inactive tool magazine at the tool fitting site. In certain embodiments, a common loading device is provided for all tool magazines so that tools can be removed from an inactive tool magazine and/or tools are inserted into an inactive tool magazine at the tool fitting site.

In certain embodiments, the currently inactive tool magazine can be equipped with one or more new tools without having to interrupt the machining of workpieces, since these can be machined simultaneously with the tools from the active tool magazine. In this way, the limited storage capacity of the tool magazines can be taken into account. That is, in practice any number of tools are available because each tool magazine can be provided with new tools without any loss of machining time.

In certain embodiments, the inactive tool magazine can be provided with a new tool set for machining second workpieces, while at the same time first workpieces are being machined with the tool set from the active tool magazine. This means that there is no interruption in production during the changeover from the machining of first workpieces to the machining of second workpieces, which consequently increases productivity.

In certain embodiments, a cover is provided for the tool fitting site of at least one tool magazine, which is closed at least when the tool magazine in question is active.

In certain embodiments, during setup at a non-active tool magazine, chips or drilling coolant cannot get out of the active tool magazine and into the non-active tool magazine or contaminate or injure operators. This means that the tool fitting sites of the two tool magazines can be arranged, terms of design, for example in terraces one above the other, so that fast set-up is possible, which may be advantageous from a design point of view and may increase productivity.

At least some objects can be achieved in accordance with the present disclosure with machine tools of the different types, for instance involving machines having a moving column and portal-type machines. The present disclosure is does not necessarily limited to a certain specific type of machine tool. In certain embodiments, the tool spindle is arranged on a moving column, on which it is movably mounted along the vertical axis. In certain embodiments, the moving column is movable along at least one of the two horizontal axes, or on a portal beam, on which it is movably mounted along the vertical axis and optionally along one of the two horizontal axes extending parallel to the portal beam.

The portal beam can be moved along the other of the two horizontal axes. When, however, the portal beam cannot be moved, the workpiece table can be moved instead along the other of the two horizontal axes.

In certain embodiments, during machining of workpieces with tools from an active tool magazine, the cover of the tool change site of the or each non-active tool magazine is closed, wherein the cover of the tool fitting site of the active tool magazine is closed, at least in certain embodiments.

In certain embodiments in accordance with the present disclosure, the productivity of the machine tool is increased in a structurally simple manner.

It is to be understood that the previously mentioned features and the features mentioned in the following may not only be used in a certain combination, but also in other combinations or as isolated features without leaving the spirit and scope of the present disclosure.

BRIEF DESCRIPTION OF THE DRAWINGS

Further features and advantages of the disclosure are disclosed by the following description of a plurality of exemplary embodiments, with reference to the drawings, wherein:

FIG. 5 is a schematic top view of an embodiment of a machine tool based on the arrangement of FIG. 3, the machine tool comprising a tool changer and a loading device for each of the tool magazines.

EMBODIMENTS

Figure 1:
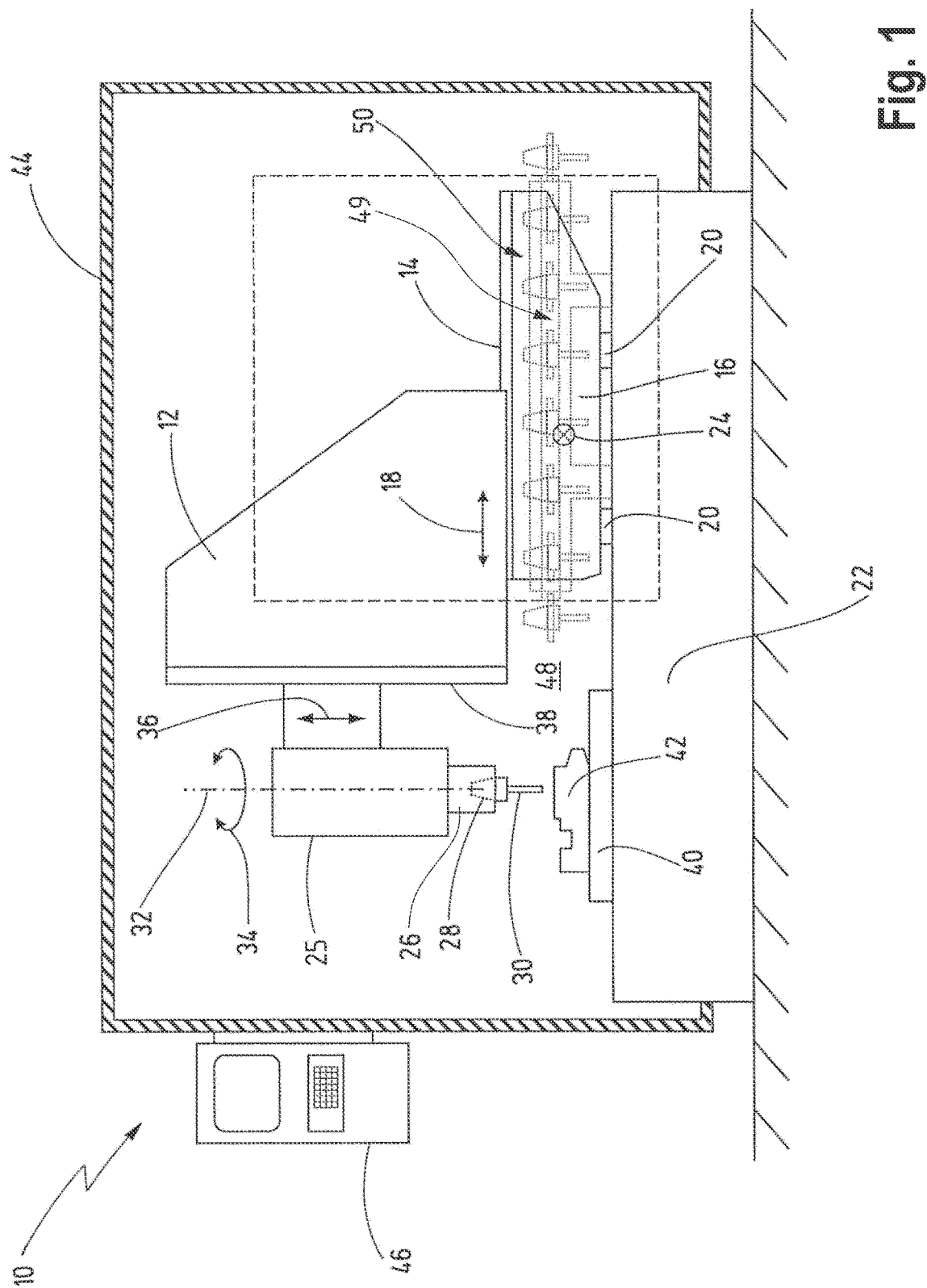
FIG. 1 is a schematic side view showing a simplified illustration of a first exemplary embodiment of a machine tool.

FIG. 1 shows a schematic side view, not drawn to scale, of a machine tool that is designated in its entirety by the reference numeral 10.

The machine tool 10 has a moving column 12, which is arranged on a cross member 16 via a first slide guide 14. The moving column 12 can be moved by means of the first slide guide 14 on the cross member 16 in the direction of an axis, which is usually referred to as the y-axis and is symbolically shown here by an arrow 18. It is understood that the moving column 12 is moved on the first slide guide 14 by means of a motor, wherein a corresponding drive unit is not shown here for clarity reasons.

The cross member 16 is mounted on a machine frame 22 via a second slide guide 20. The second slide guide 20 enables movement of the cross member 16 along a second axis, which is shown here at reference numeral 24. The reference numeral 24 designates the so-called X-axis. It is understood that the movement of the cross member 16 on the second slide guide 20 is also performed with the aid of a suitable drive unit, which is not shown here for clarity reasons.

A spindle head 25 having a tool spindle 26, which is rotatably mounted therein, is suspended vertically on the moving column 12. At its lower end, the tool spindle 26 comprises a spindle holder 28, in which a tool holder 29 having a tool 30 attached thereto can be clamped in a generally known manner. Typically, the tool holder is standardized and of the steep taper (SK) or hollow shank taper (HSK) type. The tool spindle 26 is configured to rotate the tool 30 about its spindle axis 32, which is shown by an arrow 34. Typically, the tool spindle 26 is capable of rotating the machining tool 30 at several thousand revolutions per minute, for instance for drilling and milling workpieces made from metal material.

The tool spindle 26 can be moved on the moving column 12 along the direction of an arrow 36, i.e. here in the vertical direction, by means of a drive unit, which is also not shown herein, and which can be arranged as a ball screw or linear direct drive. Accordingly, the tool spindle 26 is mounted on the moving column 12 via a third slide guide 38. The movement of the tool spindle 26 in the direction of the arrow 36 is typically referred to as the Z-axis. Typically, the three slide guides 14, 20 and 38 for the three axes of movement 18, 24, 36 are orthogonal to each other.

Reference numeral 40 designates a workpiece table that is mounted on the machine frame, on which a workpiece 42 to be machined is clamped. Reference numeral 44 designates a housing which encloses the components of the machine tool 10 described hereinbefore. Further, the reference numeral 46 designates a machine control, by means of which any movement of the machine tool 10 as well as auxiliary units (coolant supply, compressed air, and the tool magazine described below) are controlled.

Hence, that machine tool 10 is a moving column machine having a vertical tool spindle 26, in which all three axes of movement 18, 24, 36 are implemented in the tool 30. It is also possible to relocate one or both of the horizontal axes of motion 18, 24 in the workpiece table 40 in the machine tool of FIG. 1. In addition, instead of a vertically aligned tool spindle 26, the machine tool 10 can also have a horizontally aligned tool spindle.

During the machining of the workpiece 42, different tools 30 are used, which are kept in stock as a tool set 49 in a first tool magazine 50 shown only rather schematically in FIG. 1.

For the tool change, the moving column moves to the rear in the y-direction 18, i.e. in FIG. 1 to the right. The tool spindle 26 is now above the tool magazine 50, in which a blank slot is provided, into which the tool spindle 26 now places the tool holder 29 with the tool 30 that was previously in use by movement along the vertical movement axis 36. Then the tool magazine 50 advances and moves an equipped magazine slot into the transfer position below the tool spindle 26, in which a tool holder 29 with a tool 30 now intended for use is located.

In the alternative, after depositing the "old" tool 30, the moving column 12 can also approach an equipped magazine slot of the first tool magazine 50, in which the tool holder 29 with the tool 30 now intended for use is located.

In both cases, the tool spindle 12 then picks up a new tool 30 by moving again along the vertical axis of motion 36. This type of tool change is referred to as pick-up process.

Different tools 30 can thus be moved one after the other into a working space that is designated by 48 in order to machine a variety of first workpieces 42 there, one after the other, with the tools 30 from the first tool set 49.

When second workpieces 42 that are different from the first workpieces 42 are to be machined on the machine tool 10, tools 30 are generally required for this purpose, which are at least partially different from the tools 30 with which the first workpieces 42 were machined.

With conventional machine tools, then all or some of the tools 30 in the tool set 49 are replaced, resulting in extended production downtime on conventional machine tools as they are converted from machining first workpieces 42 to machining second workpieces 42.

Figure 2:
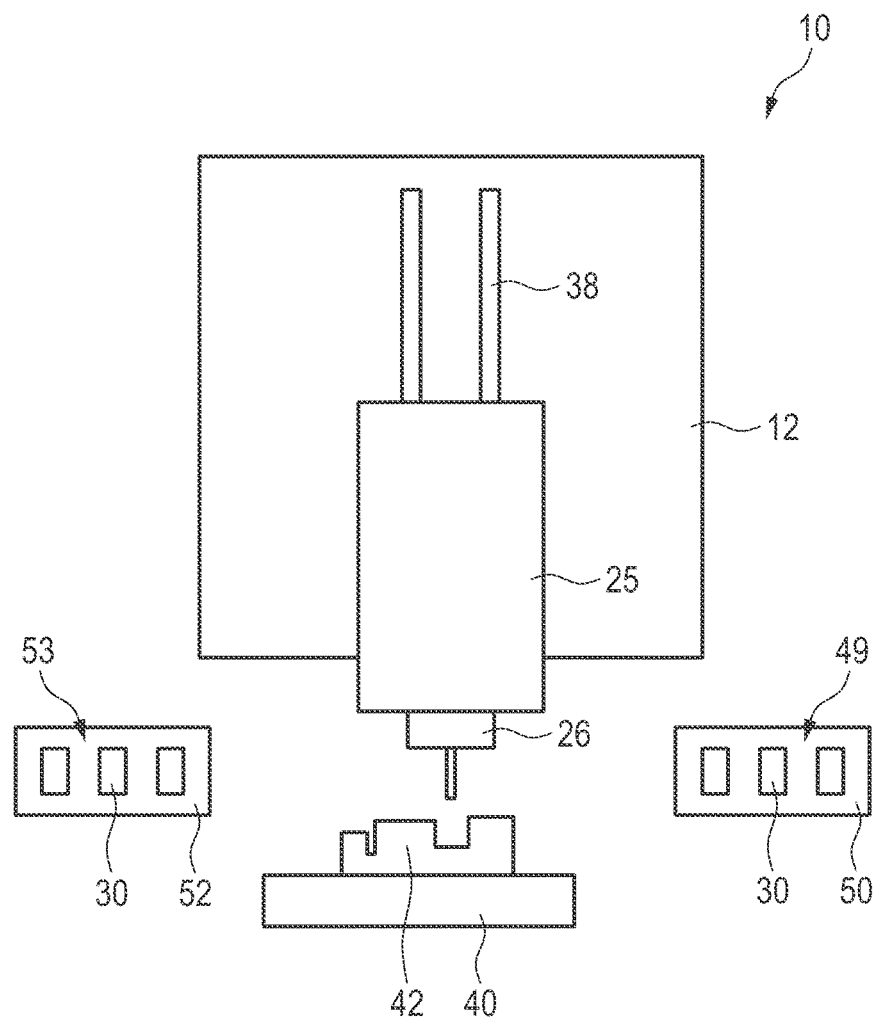
FIG. 2 is a schematic front view showing a simplified illustration of the machine tool of FIG. 1.

The machine tool 10 of FIG. 1 is therefore equipped with a second tool magazine 52, in which a second tool set 53 is kept in stock, the tools 30 of which are used to machine the second workpieces 42, as can be seen in the schematic and sectional front view of the machine tool 10 in FIG. 2.

Consequently, as soon as the machining of the first workpieces 42 is completed, the machining of the second workpieces 42 can be started immediately because the second tool magazine 52 is already ready with a second tool set 53.

The loading or equipping of the second tool magazine 52 with the second tool set 53 takes place during the period, in which the first workpieces 42 are being machined with the first tool set 49 from the first tool magazine 50, which is active during this period.

While the second workpieces are now being machined with the tools 30 from the second, now active tool magazine 52, the first tool set 49 in the first, no longer active tool magazine 50 can be renewed. On the one hand, this may involve that all tools 30 of the first tool set 49 are replaced, or that only some tools 30 are replaced.

In this way, the downtimes of the machine tool 10 are reduced to a considerable extent, because the setting-up of the respective non-active tool magazine 50, 52 can already take place during the machining of workpieces 42 with tools 30 from the active tool magazine 50, 52.

Of course, it is possible to provide more than two tool magazines 50, 52 in the machine tool 10.

If more tools 30 are needed to machine a workpiece 40 than can be stored in a tool magazine 50, 52, the tools from both tool magazines 50, 52 can also be accessed.

Figure 3:
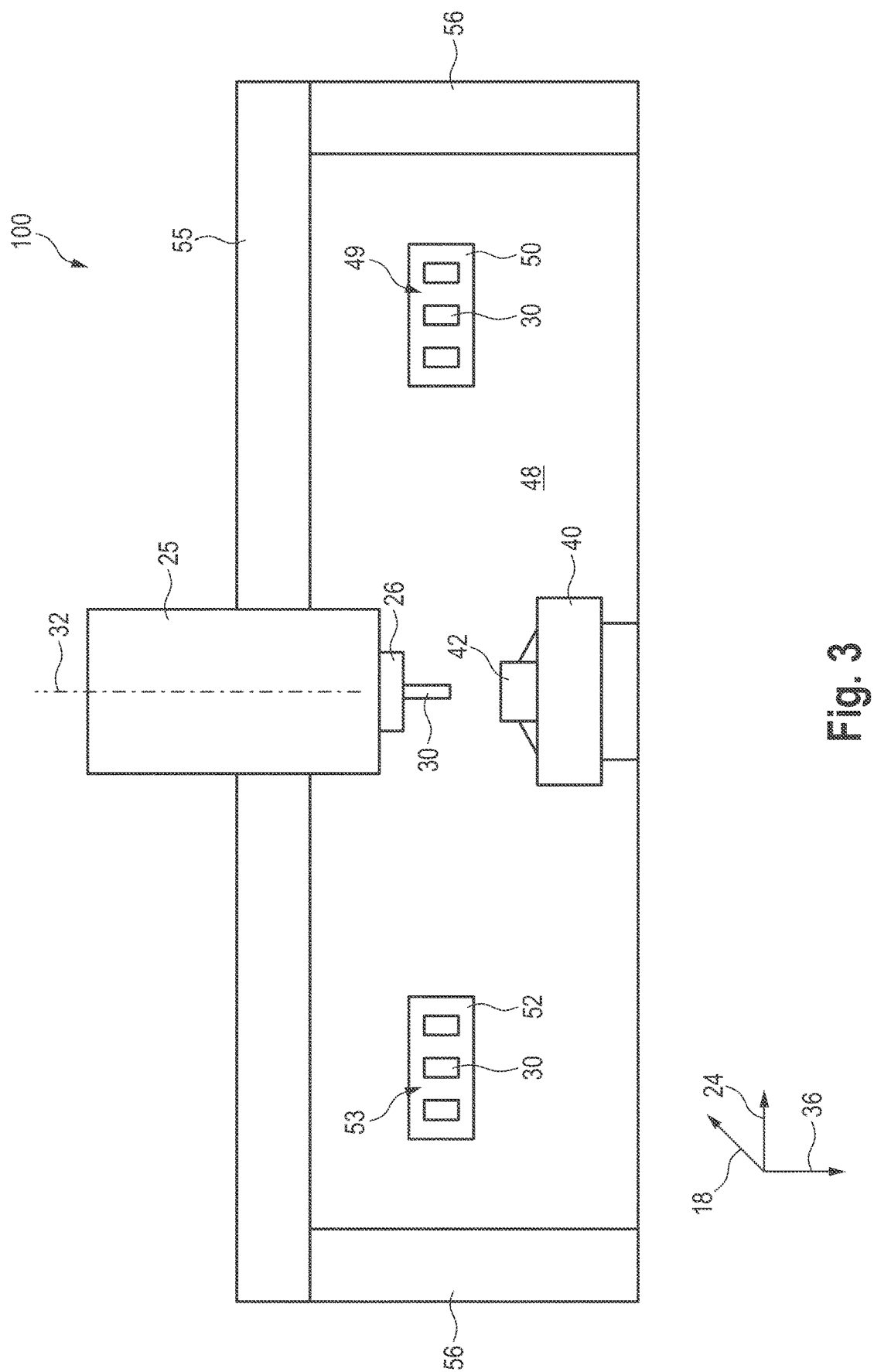
FIG. 3 is a schematic front view showing a simplified illustration of a second exemplary embodiment of a machine tool having tool magazines that are arranged side by side.

FIG. 3 shows another exemplary embodiment of the machine tool, which is designated by the reference number 100 and is arranged as a portal machine. The reference signs from FIGS. 1 and 2 are used for identical components.

The machine tool 100 of FIG. 3 comprises a portal beam 55 that is arranged on two cheeks 56 and that extends along the direction of the second axis of motion 24. The portal beam 55 is either fixedly mounted on the cheeks 56 or is mounted for movement on the cheeks 56 along the direction of the first axis of movement 18. If the portal beam 55 is fixedly mounted on the cheeks 56, the first axis of movement 18 is implemented in the workpiece table 40.

The spindle head 25 is mounted on the portal beam 55 for movement along the direction of the vertical axis of movement 36. The spindle head 25 is further movable along the portal beam 55 along the direction of the second axis of movement 24 so that the tool 30 received in the tool spindle 26 and the workpiece 42 can be moved relative to each other angle all three orthogonal spatial axes 18, 24, 36, commonly referred to as X, Y and Z axes.

Below the portal beam 55, the first tool magazine 50 with the first tool set 49 and the second tool magazine 52 with the second tool set 53 are arranged in the working space 48.

As with the machine tool 10 from FIGS. 1 and 2, the tool change is also carried out here in accordance with the pick-up method.

While the first tool magazine 50 is active, and first workpieces 52 are being machined with the first tool set 49 kept in stock therein, the second tool set 53 can again be renewed in the second tool magazine 52.

Figure 4:
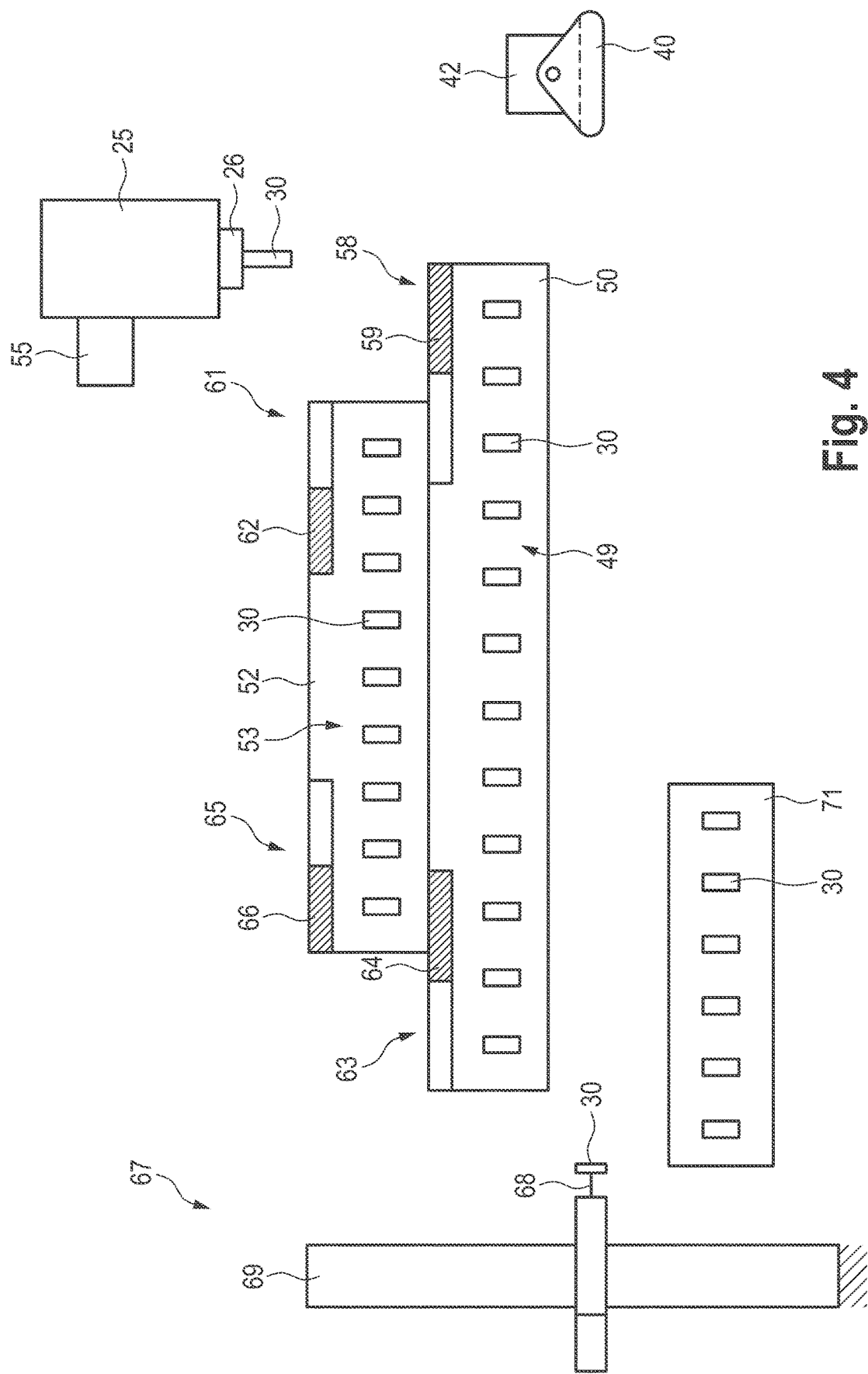
FIG. 4 is a schematic side view showing a simplified illustration of an embodiment of a machine tool based on the arrangement of FIG. 2, the machine tool provided with tool magazines that are arranged one above the other.

While FIGS. 1 to 3 show the tool magazines 50, 52 arranged side by side, FIG. 4 shows the machine tool 100 of FIG. 3 in an embodiment with tool magazines 50, 52 that are arranged one above the other.

As a further modification compared to the exemplary embodiment of FIG. 3, the workpiece table 40 is arranged here as a swivel table, which can be swiveled about a direction oriented parallel to the second axis of movement 24. Furthermore, in a generally known manner, it is also further possible to rotate or move the workpiece 42 about a vertical axis, which is parallel to the vertical axis of movement 36.

The workpiece change also takes place in the two tool magazines 50, 52, which are arranged in terraces one above the other, using the pick-up process. The first tool magazine 50, which is located at the bottom, protrudes with its tool change site 58 at the bottom beyond the upper tool magazine 52, so that the tool spindle 26 can deposit tools 30 in and remove them from both the first and the second tool magazines 50, 52.

In order to protect the tools 30 in the inactive first tool magazine 50 from the entry of contaminants, a cover 59 is provided at its tool change site 58, which can be opened or closed automatically.

In the illustrated embodiment, the second tool magazine 52 is active, so that the cover 62 is open at its tool change site 61 so that the tool spindle 25 can exchange tools 30 with the second tool magazine 52, which is currently active. The cover 62 can remain open while the workpieces 42 are being machined, or it can be closed again after each tool change.

The tool magazines 50, 52 are equipped, i.e. the tool magazines 50, 52 are loaded with a new tool set 49, 53, at the rear side of the tool magazines 50, 52, where they each have a tool fitting site 65, 63 with a cover 66, 64.

The tool change sites 58, 61 and the tool fitting site 63, 65 are formed by openings in housings of the tool magazines 50, 52, which are closed by the covers 59, 62, 64, 66 and are released when required.

While the tool fitting site 65 is closed by the cover 66 in the case of the active tool magazine 52, the tool fitting site 63 is open in the case of the non-active tool magazine 50, and the cover 64 has been pushed aside so that the tool set 49 can be renewed.

The lower tool magazine 50 also projects beyond the upper tool magazine 52 at the tool fitting site 63 at the bottom. Nevertheless, the arrangement is such that both tool magazines 50, 52 can store up to eighty tools 30 in a tool set 49, 53. In general, eighty tools 30 are sufficient to machine the workpieces 42.

A loading device 67 is provided behind the terraced tool magazines 50, 52, which exchanges tools 30 between the inactive tool magazine 50 and a background magazine 71, which is only shown schematically, by means of a tool gripper 68, which can be moved both horizontally and vertically on a column 69.

From the background magazine 71, the tool set 49, 53 of the respective non-active tool magazine 50, 52 can in this way be completely or partially renewed by means of the loading device 67, while the tool set 49, 53 of the active tool magazine 50, 52 is used to machine workpieces 42.

While a common loading device 67 is provided for both tool magazines 50, 52 in FIG. 4, a separate loading device 67 may also be provided for each tool magazine 50, 52, as illustrated in FIG. 5, which shows a schematic top view of the machine tool 100 of FIG. 3.

Incidentally, the tool magazines 50, 52 are chain magazines with tools 30 that are circulating in a loop, which is schematically indicated in FIG. 5.

In deviation from FIG. 3, the tool change to the tool spindle 26 is also performed here via tool changer 72, wherein a tool changer 72 is provided for each tool magazine 50, 52. The tool changer 72 is shown only schematically. Like the loading device 67, it may comprise a tool gripper, which moves via a suitable mechanism between the tool change site 58, 61 on the respective tool magazine 50, 52 and a changing position, in which it offers a received tool 30 to the tool spindle 26 or receives a used tool 30 therefrom in order to deposit it in the tool magazine 50, 52.

In the machining state shown in FIG. 5, the tool magazine 50 is active, the tool fitting site 63 is closed and the tool change site 58 is open. In the case of the inactive tool magazine 52, the tool change site 61 is closed and the tool fitting site 65 is open.

While in the tool magazines 50, 52 of FIG. 4, the tool change takes place from above, i.e. the covers 59, 62, 64, 66 rest on top of the housing of the tool magazines 50, 52, the tool change according to FIG. 5 takes place via the front sides of the housings.

What is claimed is:

1. A machine tool configured to machine metal workpieces, comprising:
   a tool spindle,
   a workpiece table,
   at least one first tool magazine,
   at least one second tool magazine, wherein the at least one first tool magazine is on an opposite side of the tool spindle from the at least one second tool magazine,
   a first tool fitting site for the at least one first tool magazine,
   a second tool fitting site for the at least one second tool magazine, wherein tools are exchanged at one of the first and second tool fitting sites in order to equip an inactive one of the first and second tool magazines completely or partially with new tools for machining, and
   a first tool fitting site cover, which is able to be opened and closed, is provided at the first tool fitting site, wherein the first tool fitting site cover is closed at least when the first tool magazine is active,
   a second tool fitting site cover, which is able to be opened and closed, is provided at the second tool fitting site, wherein the second tool fitting site cover is closed at least when the second tool magazine is active,
   a first tool change site for the at least one first tool magazine, wherein at the first tool change site, a first plurality of tools can be supplied one at a time to the tool spindle,
   a second tool change site for the at least one second tool magazine, wherein at the second tool change site, a second plurality of tools can be supplied one at a time to the tool spindle,
   a first tool change site cover, which is able to be opened and closed, is provided at the first tool change site,
   a second tool change site cover, which is able to be opened and closed, is provided at the second tool change site,
   wherein the tool spindle and the workpiece table are movable relative to one another along a vertical axis and along two horizontal axes so as to machine a workpiece that is clamped on the workpiece table,
   wherein the vertical axis and the two horizontal axes are orthogonal to one another,
   wherein in the at least one first tool magazine, a tool set is provided that comprises the first plurality of tools for machining a first workpiece of the metal workpieces, wherein one of the plurality of first tools can be selectively clamped in the tool spindle,
   wherein in the at least one second tool magazine, a tool set is provided that comprises a second plurality of tools for machining a second workpiece of the metal workpieces, wherein one of the plurality of second tools can be selectively clamped in the tool spindle, and wherein only one tool magazine of the at least one first tool magazine and the at least one second tool magazine is active at a time, so that exclusively the tool set from the respective active tool magazine is used for machining the metal workpieces.

2. The machine tool as claimed in claim 1,
wherein the at least one first tool magazine and the at least one second tool magazine are arranged side by side.

3. The machine tool as claimed in claim 1,
wherein the tool spindle changes tools at the corresponding one of the first and second tool change sites of the active tool magazine according to a pick-up process.

4. The machine tool as claimed in claim 1,
further comprising a tool changer, the tool changer being configured to change tools between the tool spindle and the corresponding one of the first and second tool change sites of the active tool magazine.

5. The machine tool as claimed in claim 1,
wherein the first tool change site cover is closed at least when the first tool magazine is inactive, and
wherein the second tool change site is closed at least when the second tool magazine is inactive.

6. The machine tool as claimed in claim 1, further comprising:
a common loading device for each tool magazine.

7. The machine tool as claimed in claim 1, further comprising:
a first loading device, which is arranged to perform at least one of removing tools of the first plurality of tools from and introducing tools of the first plurality of tools into the first tool magazine when the first tool magazine is inactive, and
a second loading device, which is arranged to perform at least one of removing tools of the second plurality of tools from and introducing tools of the second plurality of tools into the second tool magazine when the second tool magazine is inactive.

8. The machine tool as claimed in claim 1,
wherein a common loading device is provided for each of the at least one first tool magazine and the at least one second tool magazine.

9. The machine tool as claimed in claim 1, further comprising:
separate loading devices for each of the at least one first tool magazine and the at least one second tool magazine.

10. The machine tool as claimed in claim 1,
wherein the tool spindle is arranged on a moving column to be movable along the vertical axis with respect to the moving column, and
wherein the moving column is movable along at least one of the two horizontal axes.

11. The machine tool as claimed in claim 1,
wherein the tool spindle is arranged on a portal beam to be movable along the vertical axis with respect to the portal beam, and
wherein the tool spindle is movable along at least one of the two horizontal axes with respect to the portal beam.

12. The machine tool as claimed in claim 11,
wherein the portal beam is movable along another one of the two horizontal axes.

13. The machine tool as claimed in claim 11,
wherein the portal beam is immobile, and
wherein the workpiece table is movable along another one of the two horizontal axes.

14. The machine tool as claimed in claim 1, further comprising:
a machine control unit that is configured for operating the machine tool for machining the first workpiece and the second workpiece, the second workpiece being different than the first workpiece.

15. The machine tool as claimed in claim 14,
wherein during the machining with tools from the active tool magazine, the cover of the tool change site of the inactive tool magazine is closed.

16. The machine tool as claimed in claim 14,
wherein during the machining with tools from the active tool magazine, the cover of the tool fitting site of the active tool magazine is closed.

17. A machine tool comprising:
a tool spindle configured to hold a tool that is configured to machine metal;
a workpiece table,
at least one first tool magazine,
at least one second tool magazine, where the one first tool magazine is on an opposite side of the tool spindle from the at least one second tool magazine,
a first tool fitting site for the at least one first tool magazine,
a second tool fitting site for the at least one second tool magazine, wherein tools are exchanged at one of the first and second tool fitting sites in order to equip an inactive one of the first and second tool magazines with one or more new tools for machining, and
a first tool fitting site cover, which is able to be opened and closed, is provided at the first tool fitting site, wherein the first tool fitting site cover is closed at least when the first tool magazine is active,
a second tool fitting site cover, which is able to be opened and closed, is provided at the second tool fitting site, wherein the second tool fitting site cover is closed at least when the second tool magazine is active,
a first tool change site for the at least one first tool magazine, wherein at the first tool change site, a first plurality of tools can be supplied one at a time to the tool spindle,
a second tool change site for the at least one second tool magazine, wherein at the second tool change site, a second plurality of tools can be supplied one at a time to the tool spindle,
a first tool change site cover, which is able to be opened and closed, is provided at the first tool change site,
a second tool change site cover, which is able to be opened and closed, is provided at the second tool change site,
wherein the tool spindle and the workpiece table are movable relative to one another along a vertical axis and along two horizontal axes to machine a workpiece that is clamped on the workpiece table,
wherein the vertical axis and the two horizontal axes are orthogonal to one another,
wherein in the at least one first tool magazine, a first tool set is provided that comprises the first plurality of tools for machining a first workpiece, wherein one of the plurality of first tools can be selectively clamped in the tool spindle,
wherein in the at least one second tool magazine, a second tool set is provided that comprises the second plurality of tools for machining a second workpiece, wherein one of the plurality of second tools can be selectively clamped in the tool spindle, and wherein only one tool magazine of the at least one first tool magazine and the at least one second tool magazine is active at a time to provide the plurality of tools for machining.

18. A method for machining a first workpiece and a second workpiece, wherein the second workpiece is different from the first workpiece, the method comprising the steps of:

providing the machine tool according to claim 1, machining the first workpiece with the tool set from the at least one first tool magazine when the at least one first tool magazine is the active tool magazine, and equipping, at the same time as the machining of the first workpiece, the least one second tool magazine with the tool set for machining the second workpiece.

19. The method as claimed in claim 18, wherein during the machining with tools from the active tool magazine of the at least one first tool magazine and the at least one second tool magazine, the cover of the tool change site of the non-active tool magazine of the at least one first tool magazine and the at least one second tool magazine is closed.

* * * * *